United States Patent
Nijsse et al.

(10) Patent No.: US 6,402,118 B1
(45) Date of Patent: Jun. 11, 2002

(54) MAGNETIC SUPPORT SYSTEM (75) Inventors: Gerard Johannes Pieter Nijsse; Josephus Wilhelmus Spronck, both of Delft (NL)

(73) Assignee: Technische Universiteit Delft (NL)

( * ) Notice: Subject to any disclaimer, the term of this patent is extended or adjusted under 35 U.S.C. 154(b) by 0 days.

(21) Appl. No.: 09/509,153

(22) PCT Filed: Sep. 25, 1998

(86) PCT No.: PCT/NL98/00558

§ 371 (c)(1),
(2), (4) Date: Jun. 16, 2000

(87) PCT Pub. No.: WO99/17034

PCT Pub. Date: Apr. 8, 1999

(30) Foreign Application Priority Data

Sep. 26, 1997 (NL) .............................................. 1007127

(51) Int. Cl.[7] .............................................. F16M 13/00
(52) U.S. Cl. ........................ 248/550; 188/267; 248/638; 364/263
(58) Field of Search ................................ 248/550, 559, 248/638; 188/267

(56) References Cited

U.S. PATENT DOCUMENTS

| 4,502,652 A | 3/1985 | Breitbach | 244/75 |
|---|---|---|---|
| 4,553,230 A * | 11/1985 | Paulson | 369/263 |
| 4,583,752 A | 4/1986 | Breitbach | 280/6 R |
| 4,710,656 A * | 12/1987 | Studer | 310/51 |
| 5,732,803 A | 3/1998 | Breitbach et al. | 191/70 |
| 6,193,206 B1 * | 2/2001 | Yasuda et al. | 248/550 |
| 6,241,059 B1 * | 6/2001 | Fujita et al. | 188/267 |

FOREIGN PATENT DOCUMENTS

| EP | 0 127 741 | 12/1984 |
|---|---|---|
| EP | 0 230 626 | 8/1987 |
| EP | 0 789 160 | 8/1997 |
| EP | 0 833 074 | 4/1998 |

* cited by examiner

Primary Examiner—Ramon O. Ramirez
(74) Attorney, Agent, or Firm—Michaelson & Wallace; Peter L. Michaelson (57) ABSTRACT

There is described a support system enabling supporting an object such as a platform (1) free from vibration, in that bearing elements (50) have a stiffness (k) which at a working point ($z_0$) equals zero. A bearing element (50) comprises two magnectic couplings (51, 52) provided by permanent magnets (61, 63). One coupling (51) has a positive stiffness ($k_{51}$), and the other coupling has a negative stiffness ($k_{52}$); in the working point, the absolute values of those stiffnesses are equally great. Alternatively, electrostatic couplings are used.

11 Claims, 5 Drawing Sheets

MAGNETIC SUPPORT SYSTEM

BACKGROUND OF THE INVENTION

1. Field of the Invention

The invention relates to a support system in which an object can be supported free from vibration such that it can behave as if it floats freely, uncoupled from its environment. That object may be a platform or worktop or table, on which an experimenting arrangement can be built up, and the invention will therefore hereinafter be described for such a practical example. However, it will be understood that other practical examples are also possible, for instance specific parts in a positioning system.

2. Description of the Related Art

An important requirement imposed on such a platform is that the platform is positioned free from vibration, i.e. environmental vibrations must not be felt in the platform and the experimenting arrangement built thereon. This entails the problem that the platform must somehow be supported relative to a fixed world (floor), for instance for counteracting gravity, which fixed world is generally not free from vibrations.

An important requirement imposed on such a platform is that the platform is positioned free from vibration, i.e. environmental vibrations must not be felt in the platform and the experimenting arrangement built thereon. This entails the problem that the platform must somehow be supported relative to a fixed world (floor), for instance for counteracting gravity, which fixed world is generally not free from vibrations.

Generally, the bearing or suspension of the platform can be regarded as a spring system. Vibrations in the outside world cause length variations in the spring system, which length variations are translated into variations in the force F exerted on the platform by the spring system. That force F can generally be described by the known formula $$F = m\frac{d^2 x}{dt^2} + c\frac{dx}{dt} + kx,$$

where x represents said length and k represents the stiffness of the spring system. For vibrationless support systems, it is desired that k be as small as possible.

Conventionally, damping elements having a low stiffness are incorporated into the support or suspension, for instance rubber blocks in the support or long, weak springs in the suspension, and the platform is constructed with or attached to a heavy mass. Because of the low stiffness of the damping elements, force variations are relatively low, and because of the heavy mass of the platform, the vibration amplitudes caused by the force variations are relatively small. However, this conventional approach yields insufficient result.

A better result is provided by a support system in which the support for the platform has a working point in which the stiffness is zero, while within a certain working area around that working point, the stiffness has particularly low values. However, known support systems with zero stiffness have a number of drawbacks, as will be discussed in more detail hereinbelow.

BRIEF SUMMARY OF THE INVENTION

It is a general object of the present invention to eliminate the drawbacks of the prior art.

More in particular, it is an object of the present invention to provide a zero stiffness support system wherein there is no mechanical contact between the platform and the fixed world, wherein, in principle, no external energy is required for supporting, and wherein the system has a particularly simple and compact construction.

In accordance with an important aspect of the present invention, the positioning system comprises at least two electric or magnetic couplings, one of which exerts a repulsive force of a positive stiffness on the platform, and the other one of which exerts an attractive force of a negative stiffness on the platform, in such a manner that the sum of said forces has a zero stiffness in a working point.

These and other aspects, features and advantages of the present invention will be clarified by the following description of a preferred embodiment of a support system according to the invention, with reference to the accompanying drawings, in which identical reference numerals denote identical, or comparable parts, and in which:

BRIEF SUMMARY OF THE INVENTION

DETAILED DESCRIPTION OF THE INVENTION

Figure 1A:
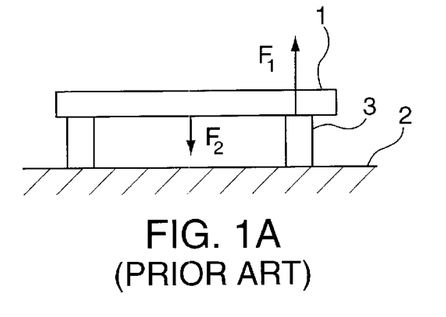
FIGS. 1A and 1B schematically illustrates the principle of bearing-mounting.
Figure 1B:
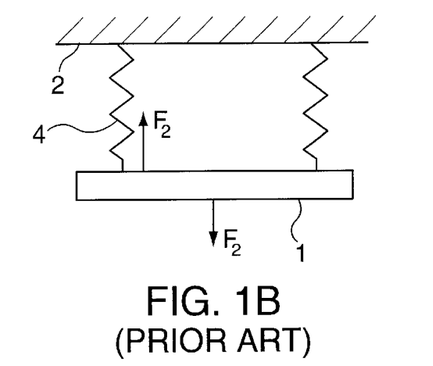

FIG. 1 illustrates the principle of bearing (A) or suspension (B) of a platform 1 relative to a fixed world 2. Hereinafter, as generic term for the relationship between platform and fixed world, the term 'coupling', 'bearing' or 'support' will be used as well.

Under earthly conditions, the gravity Fz always acts on the platform; to keep the platform in position, the platform must be retained by a counterforce compensating for the gravitational force. In the case of bearing, the platform 1 rests on support members 3 exerting a pressure force F1 on the platform; since this pressure force F1 is directed away from the support members 3, this force is also referred to as a repulsive force. In the case of suspension, the platform 1 is suspended from suspension members 4 exerting a pulling force F2 on the platform; since this pulling force F2 is directed towards the suspension members 4, this force is also referred to as an attractive force.

In rest, an equilibrium of forces is involved, i.e. the pressure force F1 or the pulling force F2 is exactly as great as the gravitational force Fz acting on the platform 1.

As will be understood by anyone skilled in the art, in practice, a platform is supported by minimally three of such members 3, 4, and said equilibrium of forces applies to all members 3, 4 together. Those three members 3, 4 are arranged at three different positions, not in line. FIG. 1 shows two members 3, 4 at two different positions. Hereinafter, those different positions will also be referred to by the term 'bearing position', and the support members 3 and/or suspension members 4 arranged at one bearing position will jointly be referred to by the term 'bearing element'.

If a weight is placed on the platform 1, an equilibrium of forces will again be established, in which the pressure force F1 or the pulling force F2 is increased. This involves the support members 3 being slightly compressed, or the suspension members 4 being slightly extended. In stationary condition, the vertical displacement $\Delta z$ of the platform 1 and the change of forces $\Delta F$, at least in good approximation (at small values of $\Delta z$), are proportional to each other according to the formula $$\Delta F = k \cdot \Delta z \qquad (1)$$

where k is the stiffness constant, whose value depends on, inter alia, the material of the members 3, 4.

Conversely, if vibrations occur in the fixed world 2, those vibrations cause length variations $\Delta z$ in the members 3, 4, as a result of which variations in force $\Delta F$ are exerted on the platform 1. Due to those variations in force, vibrations will occur in the platform 1.

If the platform 1 should be free from vibration, the members 3 and 4 respectively are designed to have a smallest possible stiffness constant k. The support members 3 may, for instance, be rubber blocks; the suspension members 4 may, for instance, be long, weak springs. Further, the mass of the platform 1 is typically chosen to be fairly great. As mentioned, the results achieved thereby are unsatisfactory for applications where high demands are imposed on the degree of being free from vibration. Hence, there is a need for arrangements wherein k is zero.

Figure 2:
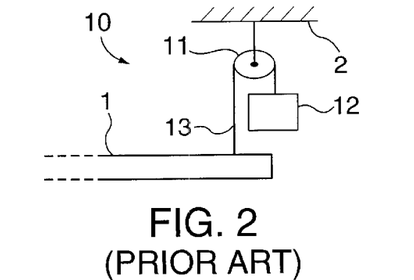
FIGS. 2–4 schematically illustrate some known constructions for obtaining gravity compensation and/or zero stiffness.

FIG. 2 illustrates the principle of a simple construction for a suspension of the platform 1. Of that suspension, only one bearing element 10 is shown in FIG. 2, for the sake of clarity. By means of a cable 13 passed over a pulley 11, the platform 1 is attached to a counterweight 12. Hence, the force is in this respect location-independent, and vibrations in the platform will hardly, if at all, be transmitted to the fixed world 2 (k is zero in that direction). It will be understood that in the ideal case, the pulling force F2 exerted on the platform 1 by the counterweight 12 does not change if the platform 1 is displaced in vertical direction. However, the arrangement of FIG. 2 is far from ideal, because vibrations in the fixed world 2 are directly transmitted to the platform 1 via the pulley 11 and the cable 13. Further, it is a drawback that the space required for the counterweight and the pulley is fairly great.

Figure 3:
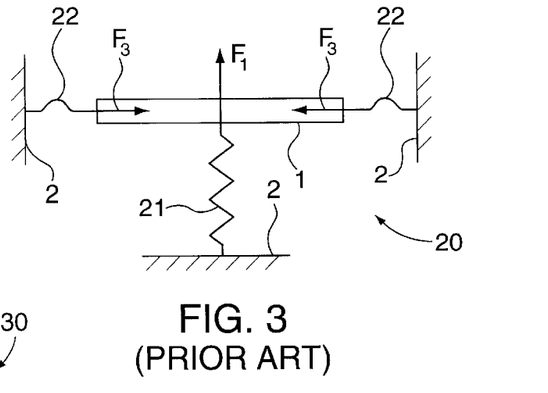

FIG. 3 illustrates the principle of another mechanical construction for a bearing element 20 in which k, at least in good approximation, is zero. Primarily, the platform 1 is supported by a helical spring 21, which in the configuration shown exerts a vertical pressure force F1, and can hence be compared with the support member 3 of FIG. 1A. By means of horizontally directed pressure springs 22, in the example outlined leaf springs, the platform 1 is laterally coupled to the fixed world 2, which pressure springs 22 exert a pressure force F3 directed according to their longitudinal direction. When the platform 1 is moved upwards, the pressure force F1 exerted by the helical spring 21 decreases. However, the pressure springs 22 are simultaneously slightly lifted from their horizontal position, and the pressure force F3 exerted by the pressure springs acquires a vertical component. In a properly balanced design, this vertical component of F3 exactly compensates for the decrease of F1.

The arrangement of FIG. 3 has a number of drawbacks as well. Vibrations in the fixed world 2 are directly transmitted to the platform 1 via the mechanical coupling provided by the pressure springs 22. Further, the system is particularly sensitive to specific frequencies in the range of from 10 to 100 Hz, on account of the resonance frequencies of the springs 21, 22. Further, the springs 21, 22 occupy fairly much space. Further, because of the manufacturing tolerances, it is particularly difficult to accurately predict the characteristics of the springs 21, 22 to be used, which means that the design of such bearing element 20 is particularly difficult, while reproducibility can hardly be realized, if at all.

Figure 4:
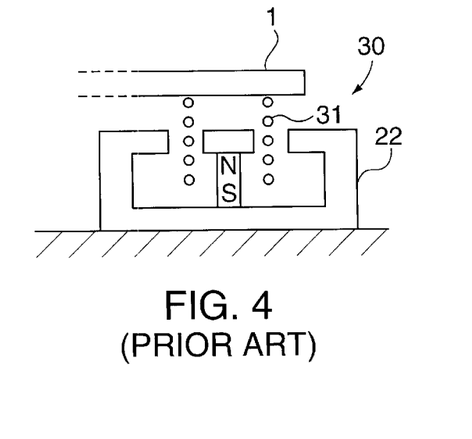

FIG. 4 illustrates the principle of an electromagnetic construction for a bearing element 30, wherein k, at least in good approximation, is zero. Connected to the platform 1 is an electric coil 31 located in an air gap of a magnet yoke 22 connected to the fixed world 2. The force exerted on the coil 31 by the magnet yoke 22 (Lorentz force $F_L = B \cdot I \cdot l$) is independent of the axial position of the coil 31, as will be understood by anyone skilled in the art. An important drawback of this Lorentz arrangement is that it requires particularly much electric energy during use. In addition, it is a drawback that during use, fairly much heat is produced, as a consequence of dissipation.

In the article "A Noncontact Permanent Magnet Levitation Table with Electromagnetic Control and Its Vibration Isolation Method Using Direct Disturbance Cancellation Combining Optimal Regulators" by K. Nagaya et al in IEEE Transactions on Magnetics, Vl.31, no.1, January 1995, p.885, an arrangement is described in which a working table is suspended by means of a permanent magnet. The permanent magnet compensates for the gravity in a working point of the arrangement, but the stiffness involved is not zero. The consequences hereof are attempted to be solved by means of electromagnets. This requires a complicated, computer-controlled regulator, and the arrangement requires fairly much energy.

Figure 5A:
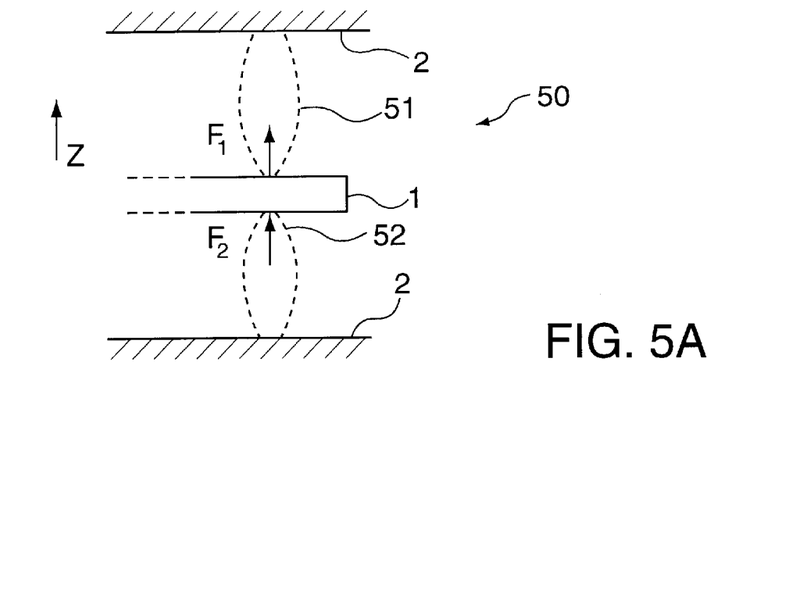
FIGS. 5A–B schematically illustrate the principle according to the present invention of obtaining zero stiffness by means of two cooperating magnetic couplings.

In accordance with an important aspect of the present invention, a bearing element 50 comprises two cooperating magnetic and/or electrostatic couplings which both have a component in the z-direction, the respective stiffnesses of those couplings having mutually different signs. This aspect is schematically illustrated in FIG. 5 for the example of magnetic couplings. In FIG. 5A, a first magnetic coupling between the platform 1 and the fixed world 2 is designated by reference numeral 51, and a second magnetic coupling between the platform 1 and the fixed world 2 is designated by reference numeral 52, while those two couplings 51 and 52 in the example shown are axially in line, substantially vertically directed. In other words, those two couplings 51 and 52 act according to the same vertically directed working line; this direction will be referred to as Z-direction. The bearing position of the bearing element 50 is defined by X and Y coordinates of said working line, but this is not shown in the Figures, for simplicity's sake.

To explain the operating principle of this aspect in more detail, reference is now first made to FIGS. 1A and 1B, and to formula 1. As explained hereinabove, in the situations outlined in FIGS. 1A and 1B, the forces F1 and F2 exerted by the members 3 and 4 respectively increases if the platform 1 is displaced against the direction of that force. Conversely, during a displacement in the direction of the force exerted, that force exerted decreases. Within the framework of the present invention, the stiffness k (formula 1) will in such a situation be referred to as being negative.

Figure 5B:
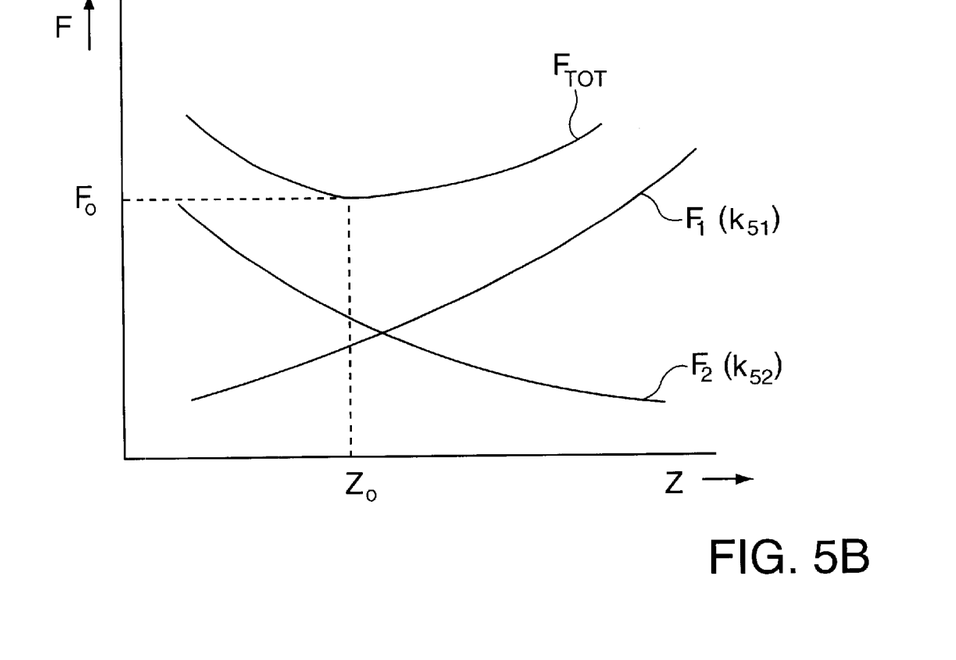

FIG. 5B is a graph in which some forces exerted on the platform 1 are plotted against the vertical position of the platform 1 to illustrate the effect of the important aspect mentioned. The positive Z-axis of a coordinate system is directed vertically upwards. FIG. 5B shows three curves. A first curve relates to the pulling force F1 exerted by the first magnetic coupling 51. A second curve relates to the pressure force F2 exerted by the second magnetic coupling 52. FIG. 5B clearly demonstrates that the stiffnesses $k_{51}$ and $k_{52}$ associated with the respective magnetic couplings 51 and 52 have mutually different signs: $k_{51}$ is positive and $k_{52}$ is negative. It is observed that in this respect, the stiffnesses $k_{51}$ and $k_{52}$ need not be constants as function of z: in FIG. 5B, this is expressed by a curvature in the curves of F1 and F2.

A third curve in FIG. 5B relates to the sum force $F_{TOT}=$ F1+F2. If at a specific vertical position $Z_0$ the stiffnesses $k_{51}$ and $k_{52}$ have mutually identical absolute values, at that point $F_{TOT}$ is not dependent on z (effective stiffness $k_{TOT}=k_{51}+k_{52}=0$). This position $Z_0$ is referred to as working point.

Hence, in the working point $Z_0$, the bearing element 50 formed by the magnetic couplings 51 and 52 has an effective stiffness which is exactly equal to zero. For small deviations of the vertical position of the platform 1 relative to the working point $Z_0$, the effective stiffness will generally no longer be exactly equal to zero, but have a very small positive or negative value, which value depends on the exact course of $k_{51}$ and $k_{52}$ as function of z. However, it will be possible to define a working area around $z_0$ within which the effective stiffness $k_{TOT}$ is smaller than a predetermined limit value which is acceptable in practice.

It is observed that it is not required that $k_{51}$ and $k_{52}$ have the same sign for all values of z; it is sufficient if $k_{51}$ and $k_{52}$ have opposite signs in a particular area around $z_0$.

In accordance with another important aspect of the present invention, the two magnetic couplings 51 and 52 mentioned are established by means of permanent magnets. Permanent magnets combine the following advantages:

the force is exerted without direct, mechanical contact;
permanent magnets do not require the supply of external energy such as electric energy for exerting the force;
through a suitable selection of the materials applied, it is possible to cause permanent magnets of relatively slight dimensions to exert a relatively great force.

Figure 6:
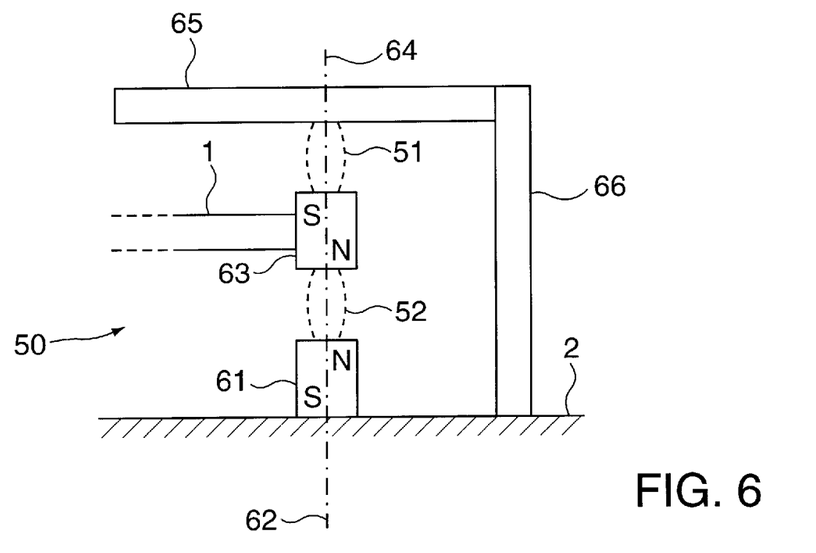
FIG. 6 schematically illustrates a practical realization of a bearing element according to the present invention.

FIG. 6 illustrates a first possible realization of a bearing element 50 according to the present invention. This bearing element 50 comprises a first permanent magnet 61 which is fixed relative to the fixed world 2, while the magnetic axis 62 of the first permanent magnet 61 is at least substantially vertically directed. The bearing element 50 further comprises a second permanent magnet 63 which is fixed relative to the platform 1, while the magnetic axis 64 of the second permanent magnet 62 is at least substantially vertically directed and at least substantially in alignment with the magnetic axis 62 of the first permanent magnet 61. The two magnets 61 and 63 have their like poles directed towards each other to exert a repulsive force F2 on each other; in FIG. 6, the north poles of the two magnets 61 and 63 are directed towards each other. The combination of the two magnets 61 and 63 defines the second magnetic coupling 52 with negative stiffness of FIG. 5A.

The bearing element 50 further comprises an attraction member 65 which is disposed above the second magnet 63 and on which the second magnet 63 exerts an attractive force F1.

The attraction member 65 is manufactured from a magnetizable material such as iron and is fixed, preferably with magnetic insulation, relative to the fixed world 2, for instance by means of a support 66 for instance made from aluminum. The combination of the second magnet 33 and the attraction member 35 defines the first magnetic coupling 51 with positive stiffness of FIG. 5A.

Figure 7A:
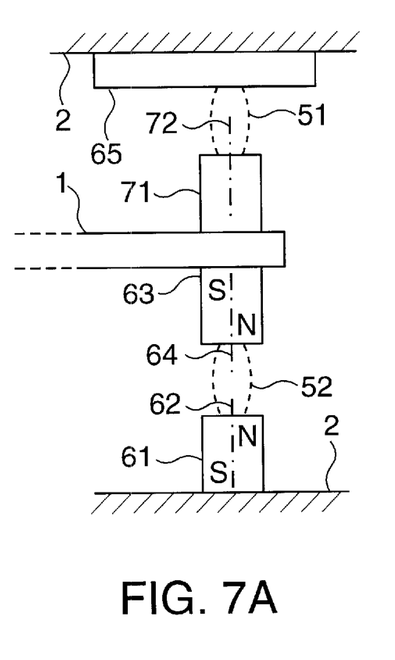
FIGS. 7A–B illustrate some variants of the bearing element according to the present invention illustrated in FIG. 6.
Figure 7B:
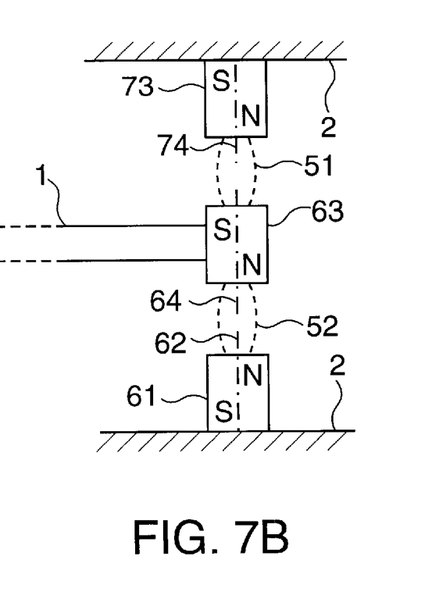

FIGS. 7A–B illustrate variants of the embodiment illustrated in FIG. 6 which all have in common that a first permanent magnetic field having positive stiffness is present (magnetic coupling 51), that a second permanent magnetic field having negative stiffness is present (magnetic coupling 52), and that both magnetic fields act on the platform 1 so as to exert a force with, in this case, a vertical component on that platform 1.

In the variant illustrated in FIG. 7A, the second magnet 63 is exclusively present for cooperation with the first magnet 61 to provide the second magnetic coupling 52. For cooperation with the attraction member 65 to provide the first magnetic coupling 51, a third permanent magnet 71 is present which is fixed relative to the platform 1 and whose magnetic axis 72 can be aligned with the magnetic axes 62 and 64. It will be understood that here, the orientation of the third magnet 71 (N-S or S-N) plays no part. However, it is advisable to arrange the third magnet 71 with its N-pole below, in order that the magnets 71 and 63 attract each other.

In the variant illustrated in FIG. 7B, the attraction member 65 has been replaced by a fourth permanent magnet 73, whose magnetic axis 74 is at least substantially vertically directed and at least substantially aligned with the magnetic axis 64 of the second permanent magnet 63. The fourth permanent magnet 73 has the same orientation as the second permanent magnet 63; in this case, this means that the north pole of the fourth permanent magnet 73 is directed towards the south pole of the second permanent magnet 63.

It will be clear that other variations are also possible. It will also be clear that combinations of the variants shown in FIGS. 7A and 7B are also possible, i.e. both the third magnet 71 and the fourth magnet 73 are present.

Hereinabove, it is explained that generally, the system has only one working point $z_0$ where the stiffness is exactly zero. In practice, it will be difficult to operate the system exactly in that working point $z_0$; once the system is outside the working point $z_0$, it may drift further and further away from that working point, which is undesired.

Further, in practice it is possible that the platform 1 is subject to an external force whose magnitude changes; to retain the platform in the desired position in that case, the force exerted on the platform by the system should be adapted to that changed external force. In other words, in such case, the bearing elements preferably have a greater apparent stiffness against external forces, while maintaining the freedom from vibration.

Further, in practice, it may be desired to move the working point to another vertical position of the platform.

Figure 8A:
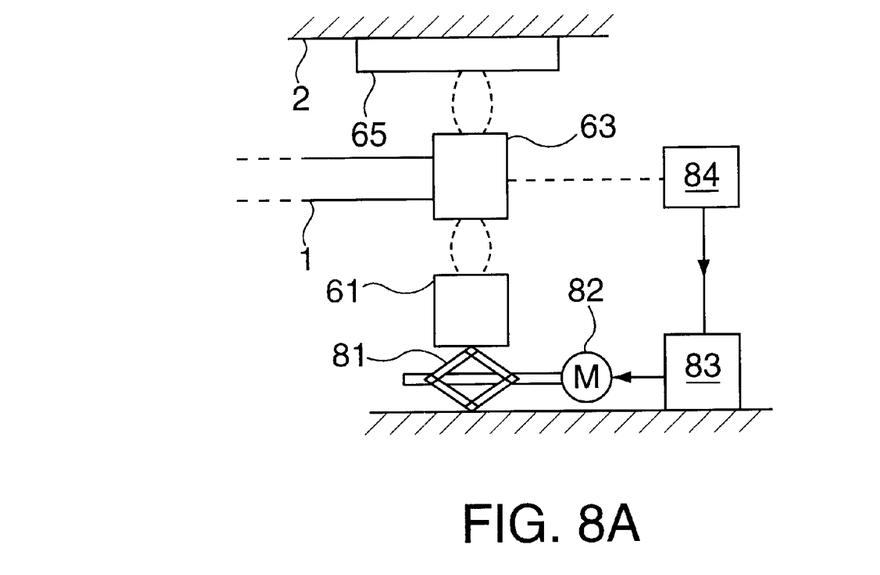
FIGS. 8A–B schematically illustrate constructions for rendering the bearing element according to the present invention illustrated in FIG. 6 settable and/or variable.
Figure 8B:
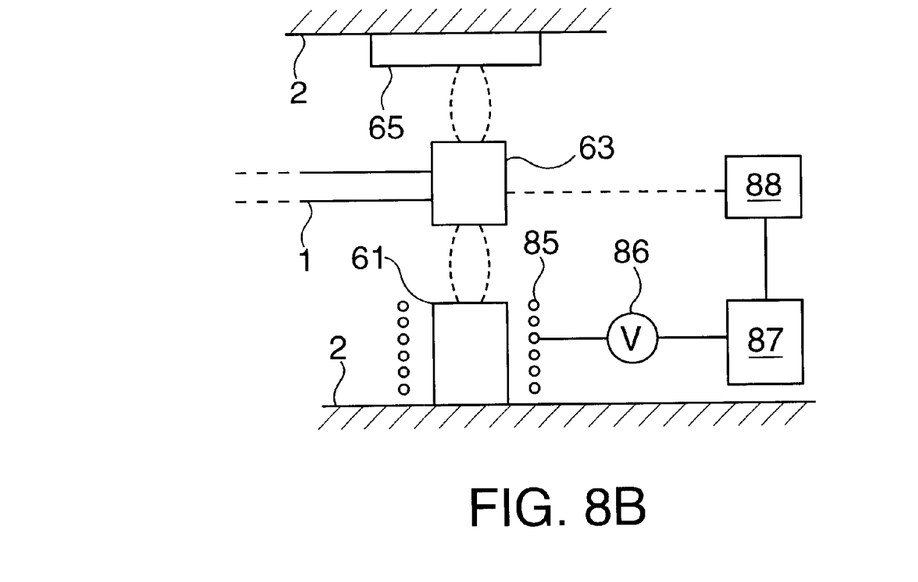

FIG. 8 illustrates that according to the present invention, it is possible in a simple manner to change the associated total force $F_0$ at a fixed working point, and/or to shift the working point $z_0$ at a fixed total force $F_0$. In this respect, two variants (and combinations thereof) are conceivable, in principle: in a first variant, the forces exerted by said permanent magnets are manipulated (air gap variations, FIG. 8A), and in a second variant, an additional force is exerted whose magnitude is manipulated (FIG. 8B).

FIG. 8A shows that by means of any suitable displacement member 81, the first permanent magnet 61 can be axially displaced, i.e. along the z-direction. Thus, a static setting of the system can be realized, but it is also possible to compensate for dynamic variations. The displacement member 81 can be driven by a motor 82 controlled by a control member 83, which can receive from a contactless position sensor 84 information concerning the exact position of the platform 1. Of course, it is also possible that the attraction member 65 or, respectively, the fourth permanent magnet 73 is displaced in the z-direction.

FIG. 8B shows that on the platform 1, an additional force can be exerted by an external force generator 85. Preferably, that external force is contactless, and that external force generator 85 is an electric coil fixed relative to the fixed world 2, as shown. Preferably, that external force generator 85 is coupled to a permanent magnet attached to the platform 1, such as the second permanent magnet 63, as shown, in order that the external force generator 85 can exert repulsive as well as attractive forces. The external force generator 85 can be fed by a power source 86 controlled by a control member 87 which can receive from a contactless position sensor 88 information concerning the exact position of the platform 1.

Alternatively, the external force generator 85 may also be a Lorentz actuator.

The external force generator 85 need not be in alignment with the other force generators (magnets).

EXAMPLE

Figure 9:
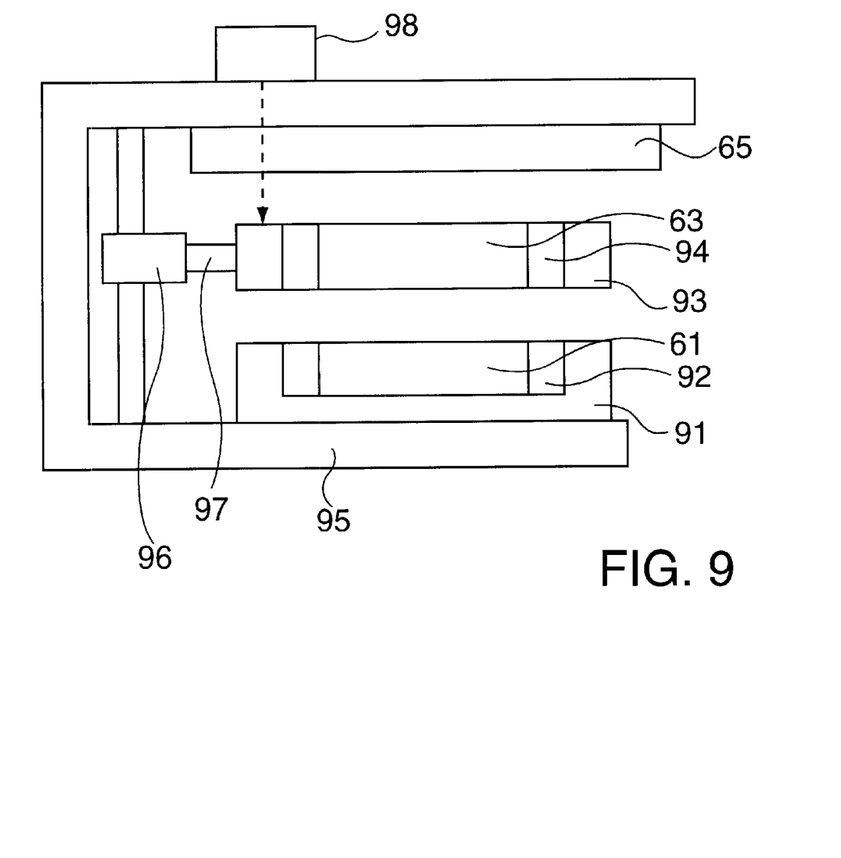
FIG. 9 schematically illustrates a test arrangement with a practically realized bearing element according to the present invention.

FIG. 9 shows a schematic cross section of a practical realization of a bearing element according to the present invention. The two magnets 61 and 63 are standardly available NdFeB magnets having a disk shape and a circular section, having a diameter of 25 mm and a thickness (height) of 10 mm. The attraction member 65 is made from iron and likewise has a disk shape having a circular section, with a diameter of 72 mm and a thickness (height) of 10 mm.

For a conduction and concentration of the magnetic field lines, the lower magnet 61 is disposed in an iron beaker 91 whose bottom and wall have a thickness of 6 mm. The wall of the beaker 91 has an inside diameter of 32 mm. Arranged between the magnet 61 and the wall of the beaker 91 is a PVC positioning ring 92. For the same reason, the upper magnet 63 is disposed in an iron, annular container 93 having an inside diameter of 32 mm, an outside diameter of 50 mm and a height of 10 mm. Arranged between the upper magnet 63 and the annular container 93 is a PVC positioning ring 94.

In a test arrangement, the attraction member 65 and the beaker 91 with the lower magnet 61 are mounted on a frame 95 so as to be fixed relative to each other. The distance between the bottom side of the attraction member 65 and the top side of the lower magnet 61 is 14 mm. The annular container 93 is fitted in a clamp 96 which is axially displaceable. The clamp 96 comprises a force sensor 97 (for instance strain gauges) for measuring the force that acts axially on the annular container 93. Further, the arrangement comprises a distance sensor 98 for measuring the position of the annular container 93.

Figure 10:
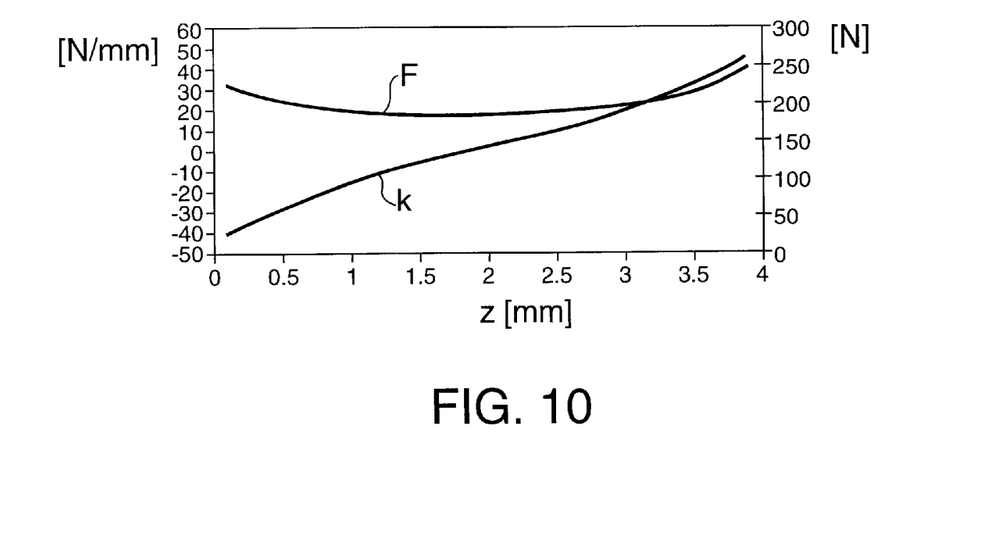
FIG. 10 is a graph illustrating the performance of the practically realized bearing element according to the present invention.

FIG. 10 shows simulation results of the test arrangement. Plotted horizontally is z, which in this case means the distance between the bottom side of the upper magnet 63 and the top side of the lower magnet 61. The curve F indicates the force undergone by the annular container 93 (scale division along the right vertical axis), excluding gravity. The curve k indicates the stiffness calculated from these measuring values (scale division along the left vertical axis). In the working point, the force is about 185 N. The gradient of the stiffness curve in the working point is about 11 N/mm², which means that in a working area of ±5 μm around the working point, the stiffness is less than 55 N/m.

In the foregoing, it is described how a contactless positioning system can be realized for a positioning with zero stiffness in one dimension (vertical), for a combination of permanent magnets 61, 63 which, in principle, act on one point of the platform 1. It will be understood by anyone skilled in the art that as far as the vertical direction is concerned, a complete support of the platform 1 can be achieved by minimally three of such suspension combinations (not in line). Of course, the platform 1 must also be positioned in the two horizontal directions (X, Y). At first, conventional means can be used therefor. However, there is also a need for a positioning system which is improved even further, in the sense that zero stiffness is achieved in all six degrees of mechanical freedom (translation in X, Y and Z direction, and rotation about X, Y and Z axis). Such requirement complicates the matter considerably, because the movements in said six degrees of freedom cannot be considered independently of each other. More in particular, the lateral stiffnesses are generally unequal to zero. In respect of the magnets 61 and 63 in FIG. 6, this can be appreciated as follows. Suppose that the platform 1 is displaced to the right over a specific distance; the repulsive pressure force between the two magnets 61 and 63 then obtains a horizontal component.

It will be understood by any skilled person that the protective scope of the present invention as defined by the claims is not limited to the embodiments shown in the drawings and discussed, but that it is possible to alter or modify the embodiments shown of a support system according to the invention within the framework of the inventive concept. For instance, it is possible that larger or smaller magnets are used, or that a plurality of magnets are arranged in parallel.

Further, it is possible that the platform itself is magnetic, so that the separate magnet 63 can be left out.

Further, the different magnets need not be in alignment.

In the foregoing, there is described, specifically in view of gravity, the example of a support with vertical force action. However, it will be clear that the invention also relates to force action in horizontal or other direction.

Hereinabove, it is explained that the arrangement according to the present invention yields a zero stiffness in one degree of freedom of movement, viz. vertical displacement. For the sake of completeness, it is observed that the construction described also yields zero stiffness during rotation about an arbitrary axis, so that in total, the zero stiffness is provided in four degrees of freedom.

In the foregoing, the invention is explained for magnetic couplings having repulsive and attractive action. However, the present invention can also be realized with electrostatic couplings (force fields), in which case, for instance, electrets can be used.

In the foregoing, the invention is explained for magnetic couplings that are effected with permanent magnets. Although this realization is preferred, it will be clear that the present invention can also be applied with the use of electromagnets.

What is claimed is:

1. A support system for supporting, substantially free from vibration, an object relative to a fixed world, comprising means for exerting a magnetic or electromagnetic or electrostatic pulling force (F1) on the object, and means for exerting a magnetic or electromagnetic or electrostatic pressure force (F2) on the object, wherein the two forces (F1, F2) have stiffnesses ($k_{S1}$, $k_{S2}$), respectively, of mutually opposite signs, such that in a working point ($z_0$), the total force ($F_{TOT}$=F1+F2) has a total stiffness ($k_{TOT}$) which is substantially equal to zero.

2. A support system according to claim 1, comprising at least one bearing element, which bearing element is provided with:

a first magnet;

an attraction member; and a second magnet arranged between the first magnet and the attraction member, for exerting said pressure force (F2) on the first magnet and said pulling force (F1) on the attraction member, wherein the first magnet and the attraction member are coupled to the fixed world, and the second magnet is coupled to the object.

3. A support system according to claim 2, wherein the two forces (F1, F2) are substantially in line.

4. A support system according to claim 2, wherein said magnets are permanent magnets.

5. A support system according to claim 4, wherein the permanent magnets are made from NdFeB or like rare earth metals.

6. A support system according to claim 2, wherein the attraction member is defined by a further magnet.

7. A support system according to claim 2, wherein a displacement means is provided for varying the axial position of the first magnet and/or the axial position of the attraction member.

8. A support system according to claim 7, wherein means is provided for controlling the displacement means, such that the axial position of the second magnet remains substantially constant.

9. A support system according to claim 2, wherein means is provided for generating an external magnetic field.

10. A support system according to claim 9, wherein means is provided for controlling the means for generating an external magnetic field, such that the axial position of the second magnet remains substantially constant.

11. A support system according to claim 2, wherein the attraction member is made from a magnetizable material such as iron.

* * * * *